United States Patent Office 3,137,245
Patented June 16, 1964

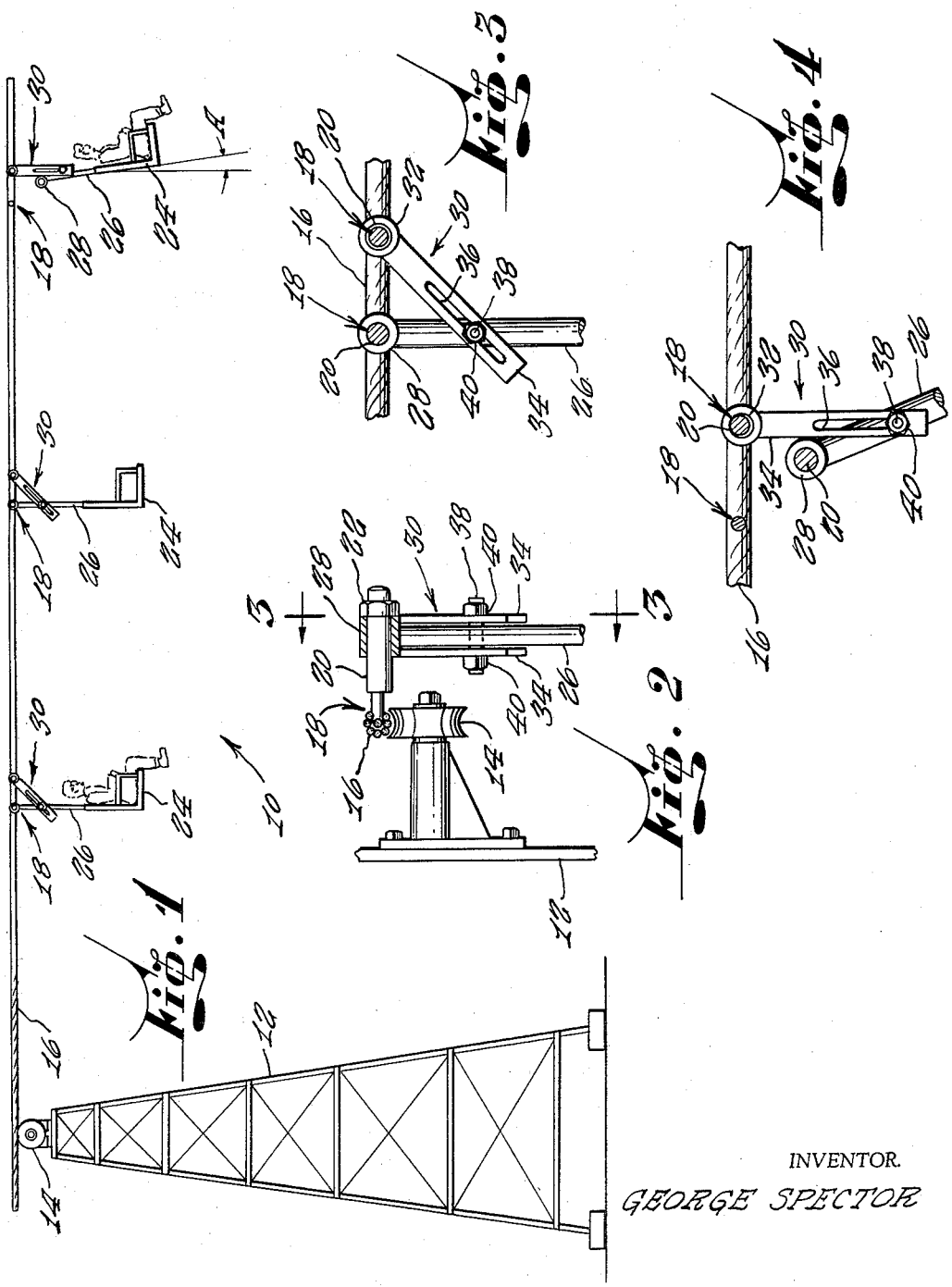

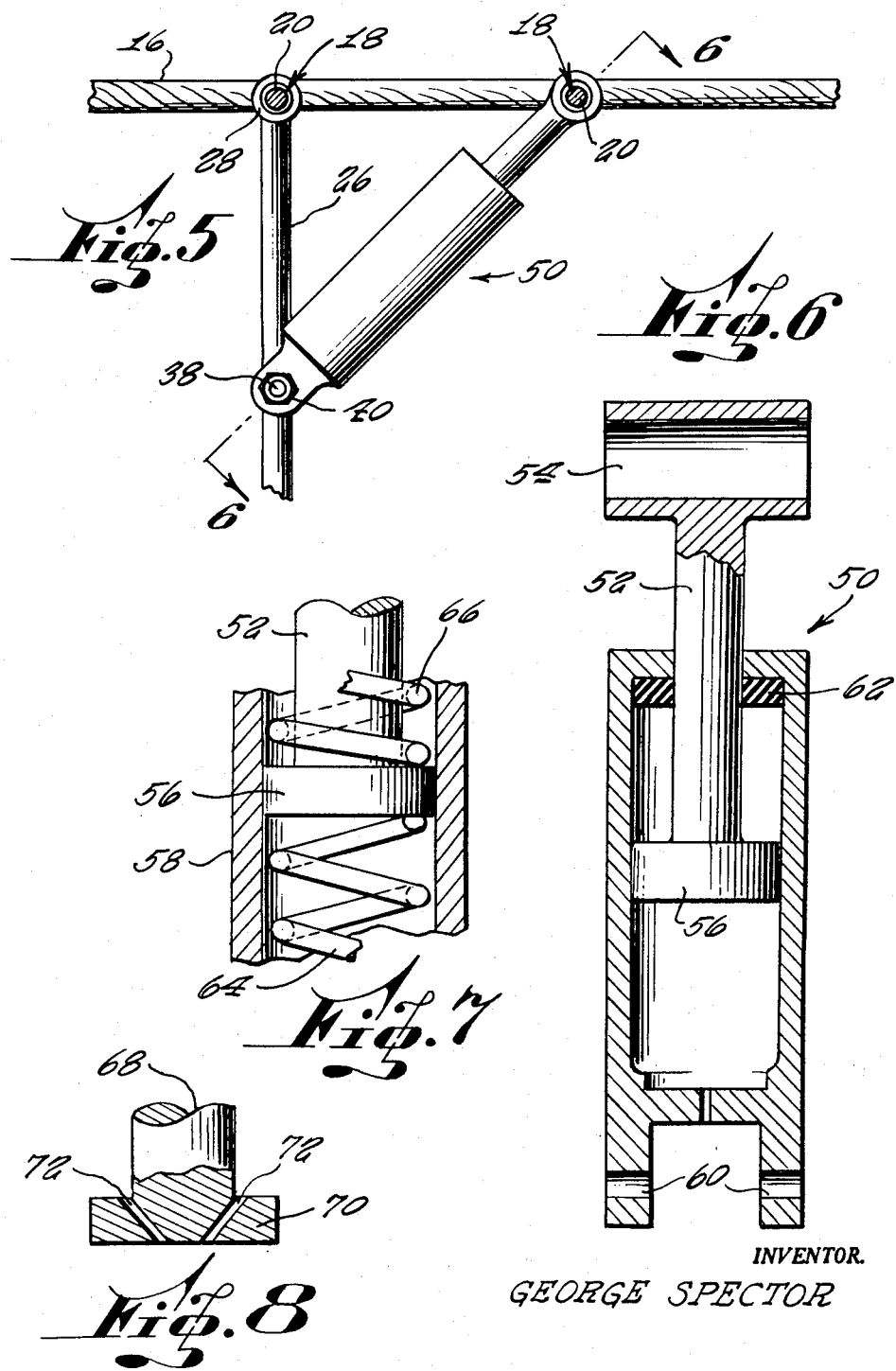

3,137,245
SAFETY CABLE CHAIRS FOR SKIERS
George Spector, 3615 Woolworth Bldg., 233 Broadway, New York, N.Y.
Filed Apr. 29, 1963, Ser. No. 276,232
9 Claims. (Cl. 104—173)

This invention relates generally to cable chairs and the like and more specifically to safety devices therefor.

Cable chairs and the like as considered in the present application are chairs, hangers or cars hung from a cable traverse supported at a height above the ground by at least two towers at the cable ends. Of course, towers may be spaced between the end towers if they are required and it is feasible. That is to say, if the cable is not excessively elevated from the ground. Devices of this type are primarily used in hilly or mountainous country for transport over a ravine or up the side of a mountain. Therefore, while the portage portions of the device are at a minimum elevation at the end towers, the cable elevation from the ground at locations between the cable terminals often exceeds several hundred feet. Primarily the present invention is directed to such a device where the cable moves and carries the portage portions from one terminal to the other. Inasmuch as the cable rides on pulleys and the like, cable brackets for suspending the portage elements are cantilevered and limited in size and strength. While such brackets are designed to support a load far in excess of normal requirements, the effects of nature and fatigue sometimes weakens these brackets causing accidents which may be fatal in nature.

Accordingly, an object of this invention is to provide a safety device to prevent accidents caused by breaking of a cable bracket of a cable chair or the like.

Another object of the present invention is to provide a safety linkage in cable chairs and the like that forms an emergency connection between the cable traverse and the portage portion suspended therefrom.

Another object of this invention is to provide the aforementioned safety device which has no limiting effect on the normal operation of the cable chairs.

Another object of the invention is to provide the aforementioned safety device which may be modified to damp oscillations of the chairs due to the effects of wind or erratic cable speeds.

The aforegoing and other objects and advantages will be more fully understood by those skilled in the art by referring to the following description and the accompanying drawings wherein:

FIGURE 1 is an elevational view of a portion of a cable chair arrangement illustrating a tower and three chairs suspended from the cable in accordance with the invention of which one cable bracket is broken to show the safety device in operation, FIGURE 2 is an enlarged end elevation of an unbroken chair and cable connection in accordance with the present invention, the cable and the top portion of the chair hanger being in section, and a pulley being included to illustrate the relationship of the pulley wheel and the connection, FIGURE 3 is an elevational view taken on line 3—3 of FIGURE 2 illustrating a cable and chair connection of FIGURE 1, FIGURE 4 is a view similar to FIGURE 3 with the main cable bracket and the safety device in operation, FIGURE 5 is a view similar to FIGURE 3 with a modified safety device, FIGURE 6 is a sectional view of the modified safety device taken on line 6—6 of FIGURE 5, FIGURES 7 and 8 are sectional views of a portion of the modified safety device of FIGURE 6 each showing a modification for providing oscillation damping.

Referring now to the drawings and particularly to FIGURE 1, a cable car or chair arrangement 10 has terminal towers 12 (only one shown) for supporting a cable traverse 16 on pulleys 14. Cable traverse 16 has a plurality of spaced brackets 18 for pivotally suspending chairs 24 each by means of a hanger 26. Each of the hangers 26 has a safety device 30 made in accordance with the invention, the device 30 at the right hand side of FIGURE 1 being operative while the other two are inoperative and the chairs are suspended by the normal connection to the cable 18.

As is particularly shown in FIGURES 2, 3, and 4, bracket 18 extends from cable 16 in a cantilevered manner and has a bearing portion 20. Each chair 24 is connected to a hanger 26 which terminates at its upper end in a sleeve 28 that is pivotally supported on the bearing surface 20 of bracket 18. A nut 22 is threaded and locked on the end of bracket 18 remote from or spaced from the cable 16 to prevent inadvertent separation of the pivotal connection formed by the bracket bearing portion 20 and the hanger sleeve 28. In accordance with the present invention, brackets 18 are provided in spaced pairs. Hanger 26 is connected to the rearmost bracket 18 while a safety link 30 is connected to the forwardmost bracket 18.

Link 30 has a sleeve 32 at one end, corresponding to sleeve 28 of hanger 26, that is pivotally supported on the bearing portion 20 of the frontmost bracket 18 which also has a nut 22 (not shown) to prevent separation of bracket 18 and link 30. Extending from sleeve 32 the link 30 is bifurcated, providing a pair of spaced arms 34, each having a slot 36. Hanger 26 extends between arms 34 and has a through bolt 38 that extends through both of the slots 36. A pair of nuts 40 are threaded and locked on bolt 38. The nuts 40 may be spaced apart sufficiently to permit unrestricted movement between hanger 26 and link 30 and free movement of bolt 38 in slots 36. Sleeve 32 of link 30 and the bearing portion 20 of the forwardmost bracket 18 may also be a loose fit. With this arrangement, hanger 26 may pivot freely on the rearmost bracket 18. Should the rearmost bracket break, the chair 24 and its hanger 26 which had been suspended by the broken bracket would drop away from the cable 14 until sleeve 32 intimately engaged the top of bearing 20 of the forwardmost bracket 18 and the bolt 38 engaged the end of the slots 36, as shown in FIGURE 4 and at the right hand end of FIGURE 1. In this condition, the chair 24 and its hanger 26 are tilted backwardly at an angle A due to sleeve 28 engaging or contacting arms 34 which tends to urge the person seated in the chair against the chair back.

If it is desirable to limit the oscillation of a chair 24 and its hanger 26, the fit of bearing 20 of the forwardmost bracket 18 and sleeve 32 of link 30 may be tight, and the nuts 40 may be positioned to frictionally clamp arms 34 against the hanger 26. In this manner, not only is oscillation damped, but when bracket 18 suspending hanger 26 breaks, the shock on the forwardmost hanger 18 is limited.

A modified safety link 50 is shown in FIGURES 5 and 6 wherein a piston 56 has a piston rod 52 connected at one end to a sleeve 54 corresponding to sleeve 32 of link 30. Piston 56, at the end of rod 52 remote from sleeve 54, is slidable in a cylinder 58 having a pair of spaced ears pivotally connected to hanger 26 by bolt 38 and nuts 40. Piston 56 and cylinder 58 may be freely movable relative to one another, or frictionally engage one another for oscillation damping as hereinbefore described. A cushion 62 may be disposed in the end of cylinder 58 for engagement by the piston 56 for shock absorbing.

As shown in FIGURES 7 and 8, springs 64 and 66 may be used in place of frictional engagement of the cylinder 58 and piston 56, or cylinder 58 may house a fluid buffer. In this arrangement, a modified piston 70, at one end of a piston rod 68, may have metering holes 72 which would limit fluid flow across the head.

Having thus described my invention, I claim:

1. A safety device in combination with a load supporting means pivotally suspended from a cantilevered bracket connnected to a cable chair arrangement, comprising a cantilevered bracket connected to said cable and spaced from the bracket suspending the load supporting means, and linkage means pivotally connected to said spaced cantilevered bracket and to said load supporting means for providing an unloaded emergency connection from said cable for suspending said load supporting means when the bracket suspending the load supporting means from the cable, breaks.

2. A safety device in accordance with claim 1, in which said linkage member is comprised of a pair of spaced arms with slots in one end of each of said arms and a sleeve connected to the other end of said arms pivotally mounted on said spaced cantilever bracket, and a bolt supported on said load supporting means and extending through the load supporting means and the slots of said linkage arms providing the pivotal connection.

3. A safety device in accordance with claim 2, in which said pivotal connection is substantially free fitting to permit unrestricted pivoting of said load supporting means on the bracket from which it is suspended.

4. A safety device in accordance with claim 2, and a pair of nut members threaded on and locked to said bolt, each nut clamping one arm of said linkage against said load supporting means for frictional resistance to relative movement therebetween to damp pivotation of said load supporting means on the bracket from which it is suspended.

5. A safety device in accordance with claim 1, and said linkage means comprises a telescoping link having a maximum extended length and being varied in length by pivotation of said load supporting means on the bracket from which it is suspended.

6. A safety device in accordance with claim 5, in which said telescoping link is comprised of a piston having a piston rod connected at one end by one of the pivotal connections, and a cylinder connected at one end by the other pivotal connection, said piston being freely movable in said cylinder.

7. A safety device in accordance with claim 6, and a shock absorbing cushion disposed in the end of the cylinder remote from the pivotal connection to be engaged by the piston head when said telescoping link is fully extended.

8. A safety device in accordance with claim 6, and a pair of spring members disposed in said cylinder each on one side of the piston and acting in opposition to the other to provide resistance to relative movement between said piston and cylinder for damping pivotal movement of said load supporting means on said bracket from which it is suspended.

9. A safety device in accordance with claim 6, said cylinder having fluid therein and being sealed against leakage, and said piston having means therethrough for metering fluid flow from one side thereof to the other to provide resistance to relative movement between said piston and cylinder for damping pivotal movement of said load supporting means on said bracket from which it is suspended.

References Cited in the file of this patent
UNITED STATES PATENTS

| | | |
|---|---|---|
| 2,938,472 | Tiegel | May 31, 1960 |
| 2,982,229 | Jenkins et al. | May 2, 1961 |
| 3,036,531 | Schule | May 29, 1962 |